United States Patent
Grafenauer

(10) Patent No.: US 11,850,774 B2
(45) Date of Patent: Dec. 26, 2023

(54) METHOD FOR PRODUCING AN EXTRUDED SHEET

(71) Applicant: FLOORING INDUSTRIES LIMITED, SARL, Bertrange (LU)

(72) Inventor: Thomas Grafenauer, Lichtenau (AT)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 238 days.

(21) Appl. No.: 16/759,041

(22) PCT Filed: Nov. 1, 2018

(86) PCT No.: PCT/EP2018/079920
§ 371 (c)(1),
(2) Date: Apr. 24, 2020

(87) PCT Pub. No.: WO2019/086566
PCT Pub. Date: May 9, 2019

(65) Prior Publication Data
US 2020/0331166 A1 Oct. 22, 2020

(30) Foreign Application Priority Data
Nov. 3, 2017 (DE) .................. 10 2017 125 743.8

(51) Int. Cl.
| | | |
|---|---|---|
| B29C 43/24 | (2006.01) |
| B29C 48/00 | (2019.01) |
| B29C 48/285 | (2019.01) |
| B29C 48/07 | (2019.01) |
| B29C 48/797 | (2019.01) |
| B29B 7/00 | (2006.01) |

(Continued)

(52) U.S. Cl.
CPC ............. *B29C 43/24* (2013.01); *B29B 7/007* (2013.01); *B29B 7/823* (2013.01); *B29B 7/90* (2013.01); *B29C 48/0011* (2019.02); *B29C 48/0022* (2019.02); *B29C 48/07* (2019.02); *B29C 48/287* (2019.02); *B29C 48/797* (2019.02); *C08J 3/203* (2013.01); *C08J 7/042* (2013.01); *C08J 7/043* (2020.01); *C08J 7/046* (2020.01); *C08K 3/26* (2013.01); *C09D 125/06* (2013.01); *E04F 15/105* (2013.01); *B29K 2027/06* (2013.01);

(Continued)

(58) Field of Classification Search
CPC . B29C 43/24; B29C 48/0011; B29C 48/0022; B29C 48/07; B29C 48/287; B29C 48/797; B29C 48/793; B29B 7/007; B29B 7/823; B29B 7/90; B29B 7/38; B29B 7/60; B29B 7/005; B29B 7/7485; C08J 3/203; C08J 7/042; C08J 7/043; C08J 7/046; C08J 2327/06; C08J 2423/00; C08J 2475/04; C08K 3/26; C08K 5/098; C08K 2003/265; C09D 125/06; E04F 15/105; B29K 2027/06; B29K 2105/0038; B29K 2105/0044; B29K 2105/16; B29K 2491/00; B29K 2509/00; B29K 2995/0096; B29L 2007/002; B29L 2031/732; B29L 2031/776; B32B 2255/04; B32B 2255/10; B32B 2255/26; B32B 2255/28; B32B 2260/025; B32B 2260/046; B32B 2264/104; B32B 2307/102; B32B 2307/4026; B32B 2307/554; B32B 2307/584; B32B 2307/7246; B32B 2307/7265; B32B 2307/732; B32B 2307/734; B32B 2307/75; B32B 2419/04; B32B 2471/00; B32B 2607/02; B32B 3/02; B32B 3/06; B32B 3/30; B32B 5/16; B32B 7/12; B32B 9/02; B32B 9/048; B32B 21/12; B32B 21/14; B32B 27/14; B32B 27/22; B32B 27/30; B32B 27/302; B32B 27/304; B32B 2255/08; C08L 27/06
See application file for complete search history.

(56) References Cited

U.S. PATENT DOCUMENTS

| | | | |
|---|---|---|---|
| 6,209,278 B1 | 4/2001 | Tychsen | |
| 6,336,988 B1 * | 1/2002 | Enlow ..................... | B29D 7/01 156/244.11 |

(Continued)

FOREIGN PATENT DOCUMENTS

| | | |
|---|---|---|
| CN | 105587100 | 5/2016 |
| CN | 106587720 | 4/2017 |

(Continued)

OTHER PUBLICATIONS

International Search Report in related International Application No. PCT/EP2018/079920 dated Sep. 5, 2019, 8 pages.

(Continued)

*Primary Examiner* — Jeffrey M Wollschlager
(74) *Attorney, Agent, or Firm* — WORKMAN NYDEGGER

(57) ABSTRACT

The disclosure relates to a method for producing an extruded sheet, which includes: a) providing calcium carbonate (CaCO₃) powder; b) providing polyvinyl chloride (PVC) powder; c) providing additives as stabilisers; e) heating the mixture until the PVC softens to form a kneadable mass and the CaCO₃ at least partially bonds to the PVC; f) cooling the mass; g) conveying the mass to an extruder; h) melting and extruding the mass by means of an extruder and moulding into a sheet by means of a slotted nozzle; i) pressing the still-warm sheet to a desired final thickness by means of at least two calendar rolls; and j) at least one layer of a pigmented lacquer is applied to the upper side; and k) an additional lacquer is applied to the pigmented lacquer to increase the scratch resistance.

19 Claims, No Drawings

(51) Int. Cl.
*B29B 7/82* (2006.01)
*B29B 7/90* (2006.01)
*C08J 3/20* (2006.01)
*C08J 7/04* (2020.01)
*C08K 3/26* (2006.01)
*C09D 125/06* (2006.01)
*E04F 15/10* (2006.01)
*C08J 7/043* (2020.01)
*C08J 7/046* (2020.01)
*B29K 27/06* (2006.01)
*B29K 105/00* (2006.01)
*B29K 105/16* (2006.01)
*B29K 491/00* (2006.01)
*B29K 509/00* (2006.01)
*B29L 7/00* (2006.01)
*B29L 31/00* (2006.01)
*C08K 5/098* (2006.01)

(52) U.S. Cl.
CPC ............... *B29K 2105/0038* (2013.01); *B29K 2105/0044* (2013.01); *B29K 2105/16* (2013.01); *B29K 2491/00* (2013.01); *B29K 2509/00* (2013.01); *B29K 2995/0096* (2013.01); *B29L 2007/002* (2013.01); *B29L 2031/732* (2013.01); *C08J 2327/06* (2013.01); *C08J 2423/00* (2013.01); *C08J 2475/04* (2013.01); *C08K 5/098* (2013.01); *C08K 2003/265* (2013.01)

(56) References Cited

U.S. PATENT DOCUMENTS

| | | | |
|---|---|---|---|
| 2008/0197523 A1* | 8/2008 | Heigel | B29C 41/36 |
| | | | 425/116 |
| 2014/0335321 A1* | 11/2014 | Reisman | B32B 38/06 |
| | | | 264/296 |
| 2016/0303868 A1* | 10/2016 | Hansson | B32B 5/24 |
| 2017/0046845 A1 | 2/2017 | Boyle et al. | |
| 2017/0183878 A1* | 6/2017 | Zhang | C04B 26/08 |
| 2017/0190848 A1* | 7/2017 | Müller | B29C 48/285 |
| 2017/0246845 A1* | 8/2017 | Chen | B32B 27/10 |
| 2018/0163413 A1* | 6/2018 | Odum | B32B 23/20 |
| 2019/0283272 A1 | 9/2019 | Zhang et al. | |

FOREIGN PATENT DOCUMENTS

| | | |
|---|---|---|
| DE | 8217074 | 9/1982 |
| DE | 19851200 | 3/2000 |
| DE | 102008058556 | 5/2010 |
| DE | 202012004994 | 8/2013 |
| WO | 97047834 | 12/1997 |
| WO | 2014161956 | 10/2014 |
| WO | 2016113377 | 7/2016 |

OTHER PUBLICATIONS

Written Opinion in related International Application No. PCT/EP2018/079920 dated Sep. 5, 2019, 8 pages.

International Preliminary Report on Patentability and Written Opinion from corresponding PCT Application No. PCT/EP2018/079920, dated Feb. 13, 2019.

Search report from corresponding DE Application No. DE102017125743, dated May 5, 2019.

* cited by examiner

METHOD FOR PRODUCING AN EXTRUDED SHEET

FIELD OF INVENTION

The invention relates to a process for the production of an extruded sheet with the following steps:
a) provision of calcium carbonate ($CaCO_3$) powder,
b) provision of polyvinylchloride (PVC) powder,
c) provision of additives in the form of stabilizers, consisting of at least Ca/Zn stabilizers, impact modifiers and internal and external waxes, where
   $c_1$) the proportion of calcium carbonate ($CaCO_3$) powder is between 60 and 80% by weight, the proportion of polyvinylchloride (PVC) powder is between 20 and 40% by weight and the proportion of additives is up to 5% by weight.
d) mixing of the calcium carbonate ($CaCO_3$) powder with the polyvinylchloride (PVC) powder and the additives,
e) heating of the mixture to a temperature of 100 to 140° C. until the polyvinylchloride (PVC) softens to a kneadable composition and the calcium carbonate ($CaCO_3$) binds at least to some extent to the polyvinyl (PVC),
f) cooling of the composition to a temperature of 40 to 50° C.,
g) conveying of the composition to an extruder,
h) melting and extrusion of the composition by means of an extruder and molding by means of a slot die to give a sheet,
i) compression of the sheet while it is still warm by means of at least two calender rolls to a desired final thickness.

The invention further relates to a sheet produced by the process. This sheet is preferably used as floorcovering.

BACKGROUND OF INVENTION

A sheet of this type is known by way of example from WO 2014/161956 A1.

Floorcoverings made of polyvinylchloride (PVC) are currently fashionable and are often known in the market by the abbreviated expression vinyl floors or LVT (Luxury Vinyl Tiles). Vinyl is a popular floorcovering for residential applications, because it has good hygiene properties, is extremely functional and can also be provided with good haptic properties. These floorcoverings are manufactured in thicknesses of about 5 mm, and can be adhesive-bonded on the substrate. There are also known PVC panels that use click-lock profiles and are therefore suitable for laying in the manner conventional for laminated floor panels: without use of glue and without direct contact with the substrate. In comparison with laminate floors, PVC floorcoverings have the advantage that they are moisture-resistant, have better haptic properties and have substantially better properties in respect of solid-borne sound and footfall noise. They can be provided with deep-profile surface structures.

Vinyl floorcoverings and LVT have the disadvantage of only limited dimensional stability and of expanding at higher temperatures, and of not always entirely returning to their original shape on cooling. Indeed, distortion effects can arise within a room if only part of the floor is affected by a temperature rise, for example in the region of a window frontage facing toward the sun. Because these products are softer than laminate, unevenness of underfloor areas is detectable on the upper side of the floor. This unevenness could be said to be "telegraphed", and this is disadvantageous. Use of plasticizers is considered by a not inconsiderable number of the population to be hazardous to health, although there are strict legal regulations regulating plasticizer use.

DE 82 17 074 U1 discloses a PVC covering for the temporary covering of floors in the form of a cut-to-size rectangular section with a wear layer and, bonded thereto, an antislip backing layer in the form of a soft plastics layer provided with a surface profile of relief type. The backing layer is provided with a high proportion of fillers, and its softness is such that walking on the covering almost, but not quite, causes adhesive bonding to the floor.

DE 20 2012 004 994 U1 discloses a floorcovering which has a core made of polyvinylchloride (PVC) and which additionally comprises fillers. Laminated to the upper side of the core there is a service layer made of PVC. On the opposite lateral edges, the panel is provided with means of connection and of locking, by way of which a plurality of panels can be connected to one another and locked to one another. Production of a panel of this type is very complicated.

Calcium carbonate ($CaCO_3$) is conventionally used as main filler in the PVC industry. US 2017/0446845 A1 discloses a plastics sheet which is produced from PVC powder and from lightweight calcium mixing powder with further additions and which is bonded to a wear-protection layer and a paper layer between three calender rolls. The sheet can be applied, with a surface layer, to a multiroll calender, and the outer layer can consist of plastic.

SUMMARY

Starting from the above, the invention has the object of providing a floorcovering which has the useful properties of a PVC floor but avoids the abovementioned disadvantages of same, in particular the "telegraphing" of unevenness from the underfloor areas, while having a particularly high-quality visible side that makes a good visual impression on the observer.

The process features the following for solution of the problem:
j) at least one layer of a pigmented lacquer is applied to the upper side, and
k) in order to increase crack resistance, a further lacquer is applied to the pigmented lacquer.

It is preferable that the further lacquer is applied in at least two layers. In order to ensure good abrasion resistance, the quantity applied for the first layer is about 80 to 100 g, and in order to achieve the scratch resistance the quantity applied for the second layer is about 10 to 30 g.

DETAILED DESCRIPTION

The process of the invention begins by reversing the approach hitherto frequently adopted to the production of PVC sheets. A mineral base is provided, and the calcium carbonate is adopted as main material for the sheet and is bound by PVC. The sheet produced by this process is extremely dimensionally stable, water-resistant, and has high density. It therefore provides a very acceptable level of footfall noise, and is sufficiently hard to compensate unevenness from the underfloor or to prevent "telegraphing", and it is moreover sufficiently stable to permit edge-profiling with application of what are known as "click-lock profiles" which permit connection of a plurality of sheets to one another without use of glue. "Click-lock" profiling is well known from the laminate floor industry (for example from DE 198 51 200 C2 or WO 97/047834 A1). The elasticity of the material is greater than that of panels made of wood-based material, and the surface is more homogeneous, and it is therefore possible to use a wider range of click-lock profiles.

It has been possible by this means to achieve a particularly good result because the proportion of $CaCO_3$ is greater than the proportion of PVC. The proportion of calcium carbonate ($CaCO_3$) powder is preferably between 65 and 80% by weight, with particular preference between 70 and 80% by weight and very preferably 75% by weight. The proportion of polyvinylchloride (PVC) powder is then correspondingly adjusted thereto, and is preferably between 20 and 35% by weight, in particular between 20 and 30% by weight and very preferably 25% by weight. The necessary proportion of additives must naturally be taken into account here.

Preferably, initially only 30% to 40% of the proportions by weight provided of calcium carbonate ($CaCO_3$) powder are mixed (under hot conditions) with the polyvinylchloride (PVC) powder and the additives, and the remaining proportions by weight of calcium carbonate ($CaCO_3$) powder are mixed into the cooling or cooled composition.

It is also possible to mix color pigments, for example carbon black, into the mixture at the start or when the remaining calcium carbonate ($CaCO_3$) powder provided is mixed into the mixture, thus producing a colored sheet.

It is preferable that the polyvinylchloride powder and the additive powder are free from plasticizers, thus permitting production of a sheet that is completely free from plasticizer.

The quantity used of the calcium/zinc (Ca/Zn) as stabilizer is preferably less than 5 parts by weight.

The grain size of the polyvinylchloride powder is in the range of 80 to 200 μm.

The grain size of the calcium carbonate powder used is preferably 1 to 10 μm.

The width of the slot die of the extruder is preferably 1250 mm and/or its thickness is preferably 2 to 10 mm, with particular preference 4 mm, thus permitting production of a large-format sheet from which a plurality of individual panels can be separated. The sheet width can correspond to the length of a panel.

It is preferable that the extruded sheet is passed over three or four, in particular up to five, calender rolls, and by means of the calender rolls it is also possible to impress a structure into the upper side of the extruded sheet. The structuring can also be achieved by means of a press plate or structuring foil.

It is preferably possible in a first step to impress the structure into the surface of the upper side and in a second step that follows same to print the decorative effect in digital printing which takes into account the structure.

When the upper side of the sheet has been structured, it is possible to brush-wipe the upper side after the application of the first further lacquer layer, in order to ensure that the lacquer layer applied does not cover the structure. For this purpose, at least one rotating brush is provided which extends across the entire width of the sheet. The axis of rotation of the brush here can be arranged at right angles to the direction of transport of the sheet. Oblique positioning of the axis of rotation with respect to the direction of transport of the sheet is also possible. It is equally possible to provide a plurality of brushes in succession. It will be self-evident that the brush-wiping procedure does not remove the lacquer completely from the upper side, but merely reinstates the structure.

It is preferable that the at least two further lacquers have different gloss levels in order to improve the visibility of the structure. The first lacquer layer, which can be brushed into the structure, determines the gloss level at the base of the structure, and can preferably also be softer than the second or final lacquer layer applied, which increases scratch resistance and must be present on the prominent portions of the structure, and determines the gloss level at those locations. Scratch resistance is less important in the valleys than on the elevations.

The second further lacquer layer is preferably applied by way of a sponge-rubber roll after the first lacquer layer has been brushed by the rotating brush into the valleys. The first further lacquer layer can be incipiently cured before the second further lacquer layer is applied.

It is preferable that the at least two further lacquers have different hardness values, in particular, the first lacquer can be softer than the second lacquer.

In order to ensure that the lacquers to be applied do not penetrate into the valleys of the structured surface and destroy, or at least greatly dilute, the structuring effect, it is also possible in the case of very high throughput speeds of, for example, 120 m/s, to apply a castable lacquer and, immediately thereafter, to harden this by using electron beams or very powerful UV sources, or by using a combination of both, to an extent that prevents any further flow into the valleys of the structure.

If, together with the sheet, a decorative polyvinyl film and/or a protective polyvinylchloride film is introduced over the calender rolls and pressed with the sheet, the production process is further simplified and a ready-to-use product is produced that then requires only division into individual panels.

It is also possible to laminate (adhesive-bond) a decorative foil to the upper side of the extruded sheet. It can be applied above the structured upper side. Another possibility is subsequent structuring into the decorative foil applied by lamination.

The upper side can be printed with a decorative effect. The printing can be achieved digitally. For this purpose it is preferable that, before the printing procedure, a primer is applied as basecoat to the upper side. This can be a colored primer. Instead of, or in addition to, the primer it is also possible to apply a pigmented basecoat by printing. The pigmented basecoat creates a base for a decorative print, thus permitting subsequent saving of ink.

The decorative effect is preferably a decorative wood effect.

The aim of lacquering the upper side of the sheet with pigmented lacquers is by way of example to obtain a single-color sheet. This lacquer system preferably has high gloss.

It is preferable that the decorative print is applied in a manner appropriate for the structure impressed into the upper side of the sheet. In particular, the decorative print can be applied synchronously. This means by way of example in the case of a decorative wood effect that the print and the structure represent the wood grain and pores, thus providing not only an optical but also a haptic natural-wood effect.

It is also possible that the single-color lacquer system is applied to a structured upper side.

A wood veneer can also be adhesive-bonded to the extruded sheet. The wood veneer can be lacquered with high-abrasion-resistance lacquers or provided with a corresponding coating, and can be presented with a topcoat in conjunction with a primer. A completely natural representation of the character of the wood is thus provided. With this variant it is possible to realize an extremely thin, dimensionally stable wood floor which has a moisture-resistant and high-strength backing board and which could even be used in wetrooms.

Scratch resistance is increased by lacquering of the sheet coated with the lacquer. Lacquering to increase scratch resistance can be achieved with UV- or electron-beam-curing lacquers, or coating can be carried out with a polyurethane or polyolefin in the procedure known as Hot coating.

In order to provide damping of solid-borne sound, the underside of the sheet, i.e. the side opposite to the coating, can in particular be coated with XPS (extruded polystyrene) or cork. This improves downward solid-borne-sound properties, which are impaired by the high density of the sheet, which is preferably 1900 to 2100 kg/m³, in particular 2000 kg/m³. In principle, any of the products available in the market are suitable for damping solid-borne sound. The preferred applied thickness of the coating, in particular the extruded polystyrene or the cork layer, is 1.0 to 1.5 mm.

The sheet can be used not only as floorcovering but also as wallcovering or ceiling covering. Because it is dimensionally stable, when it is used as floorcovering it can be intended for laying without direct contact with the substrate or for adhesive bonding to the underfloor. Because the sheet is moisture-resistant, it can also be used in wetrooms. Adhesive bonding prevents ingress of water.

Panels (planks) or smaller-format sheets can be cut from the large-format sheet. These sheets can by way of example be used like tiles for planking of a wall or of an underfloor. For reasons of cost and weight, when a sheet is used as wallcovering it is preferably produced with a thickness of 2 to 3 mm. The tile can be smooth or can have a structure.

The production procedure involves mixing $CaCO_3$ powder (chalk), PVC powder, and the powder with the additives, in a mixer and heating to a temperature of about 120° C. Initially only about 30% of the calcium carbonate powder provided can be mixed with the polyvinylchloride powder, with resultant binding of the calcium carbonate to the surface or within the PVC. Once the powder has been adequately mixed together and this mixture has the softness required for kneading, the composition is cooled to a temperature of 40 to 50° C., and then the remaining 70% of the calcium carbonate powder provided is mixed into the cooling or cooled composition. This procedure saves energy because there is no requirement for immediate heating of the entire calcium carbonate powder. Because in any case only about 20 to 30% of the $CaCO_3$ powder can be bound on the surface or within the PVC, mixing of the remaining $CaCO_3$ powder into the cooled composition is problem-free. It is also possible in principle, however, that all of the proportions by weight are immediately mixed together. In this case, the free calcium carbonate powder becomes very well dispersed in the mixture.

A preferred inventive example uses 300 parts by weight of calcium carbonate powder, 100 parts by weight of polyvinylchloride powder and 15 parts by weight of additives in the form of stabilizers.

In order to prevent any separation, this composition is then preferably conveyed by means of screws to an extruder. In order to achieve good binding of the individual constituents, the extruder is equipped with screws that form a long restricted-flow zone. At the extruder outlet there is a slot die, the width and thickness of which are selected in accordance with the desired dimensions of the sheet. The width of 1250 mm and the thickness of 4 mm have been found to provide ease of operation. A material in sheet form at a temperature of about 165° C. emerges from the slot die and is compressed to the final thickness by way of three vertically arranged calibrator rolls. By virtue of the vertical arrangement of the rolls, during calibration the material is passed twice, in each case in a semicircular path, firstly over the second roll and then over the third roll. The particular feature of the process is thus that a printed decorative PVC film and a protective PVC film are passed simultaneously with the sheet through the calender. The second calender moreover has a surface comprising a structure (generally a wood structure), the final product therefore being a finished sheet with a decorative structured surface and with a protective layer, which then only requires subsequent lacquering in order to increase scratch resistance. After this, the product is cut to size and the lateral edges are profiled.

The decorative PVC films and/or protective films used can comprise plasticizer. This variant of the sheet is then not completely free from plasticizers, but comprises substantially less plasticizer than conventional LVT.

The process can also be implemented in a variant where the material, or the sheet, is calibrated without application of a decorative film. In that case, a smooth calender is used rather than a structured calender. The sheet is then either digitally printed or printed with pigmented lacquers, then divided into panels and optionally provided with appropriate protective lacquers and with a topcoat, and then processed to give a floor. This process can use UV lacquers or preferably electron-beam-curing lacquers. The latter have proven to have particularly good suitability for floors. In this variant, the final product comprises absolutely no plasticizers.

In a further variant, the material, or the sheet, can be provided with a structure during calibration, but without decorative film and without protective film. The upper side of the sheet is initially base-coated with a print primer and then is digitally printed specifically in a manner such that the printed image coincides with the structure (embossed register). In this case it is possible to replicate decorative wood effects, or else decorative stone effects or any other patterns (abstract decorative effects). This is followed by coating with protective coating material by way of castable coating materials which conform to the surface of the sheet.

The topcoats are applied by way of sponge-rubber rolls. Here again, UV lacquers or electron-beam-curing lacquers can be used. This variant, too, is free from plasticizers. The particular feature of this variant is that the (digital) decorative printing takes place after a structure has been provided to the upper side of the sheet. The printed image consequently conforms to the structure. In the conventional procedure, the structure is impressed in a final step into the upper side of a sheet, i.e. the structure conforms to the decorative effect.

The sheet can be produced in any desired color.

The sheet obtained from the extruder can also be provided without structuring. In this case, it can be lacquered with a pigmented lacquer in order, for example, to provide a single-color sheet. Lacquering with the pigmented lacquer can also take place on a structured upper side. In order to increase scratch resistance and abrasion resistance, the lacquered or coated sheet is covered with UV- or electron-beam-curing lacquers, or is covered with a polyurethane or polyolefin in the procedure known as Hot coating.

If the intention is to use the sheet for the floor sector, damping of solid-borne sound can be applied to all of the abovementioned variants. Footfall noise level, i.e. noise level perceived within the room, is very good because of the high density of the sheet.

The invention claimed is:

1. A process for the production of an extruded sheet comprising at least the following steps:
    a) provision of calcium carbonate (CaCO3) powder,
    b) provision of polyvinylchloride (PVC) powder, c) provision of additives in the form of stabilizers, comprising at least Ca/Zn stabilizers, impact modifiers and internal and external waxes, where
  c1) the proportion of calcium carbonate (CaCO3) powder is between 70 and 80% by weight, the proportion of polyvinylchloride (PVC) powder is between 20 and 30% by weight and the proportion of additives is up to 5% by weight,
d) mixing of a first portion of the calcium carbonate (CaCO3) powder with the polyvinylchloride (PVC) powder, and the additives, and then
e) heating of the mixture to a temperature of 100 to 140° C. until the polyvinylchloride (PVC) softens to a kneadable composition and the calcium carbonate (CaCO3) binds at least to some extent to the polyvinylchloride (PVC), and then
f) cooling of the composition to a temperature of 40 to 50° C., after which a second remaining portion of calcium carbonate (CaCO3) is mixed with the composition,
g) conveying of the obtained composition to an extruder by means of screws, wherein said extruder comprises an outlet and a slot die at said outlet,
h) melting and extrusion of the composition by said extruder and molding by said slot die to give a sheet, and then
i) compressing the sheet following the step of melting and extrusion while the sheet generally maintains the temperature when emerging from the slot die by means of at least two calender rolls to a desired final thickness.

2. The process as claimed in claim 1, wherein the polyvinylchloride (PVC) powder and the additive powder are free from plasticizers.

3. The process as claimed in claim 1, wherein the extruded sheet is passed over at least three calender rolls.

4. The process as claimed in claim 1, wherein, together with the sheet, a decorative polyvinylchloride (PVC) film and/or a protective polyvinylchloride (PVC) film is passed over the calender rolls and pressed with the sheet.

5. The process as claimed in claim 1, wherein the calender rolls are used to impress a structure into the upper side of the extruded sheet.

6. The process as claimed in claim 1, wherein:
  j) at least one layer of a pigmented lacquer is applied to an upper side of the sheet, and
  k) a further lacquer is applied to the pigmented lacquer to increase crack resistance.

7. The process as claimed in claim 6, wherein, before lacquering, a primer is applied as a base coat to the upper side of the sheet.

8. The process as claimed in claim 6, wherein the further lacquer is a UV- or electron-beam-curing lacquer.

9. The process as claimed in claim 6, wherein the further lacquer is applied in at least two layers.

10. The process as claimed in claim 9, wherein, after the application of the first further lacquer layer, the upper side of the sheet is brush-wiped.

11. The process as claimed in claim 9, wherein the at least two further lacquers have different gloss levels.

12. The process as claimed in claim 9, wherein the further lacquer includes first and second lacquers have different hardness values.

13. The process as claimed in claim 1, further comprising division of the extruded sheet into a plurality of smaller sheets.

14. The process as claimed in claim 6, wherein color pigments are mixed into the pigmented lacquer and/or the sheet.

15. The process as claimed in claim 12, wherein the first lacquer is softer than the second lacquer.

16. The process as claimed in claim 13, wherein the plurality of smaller sheets is panels.

17. The process as claimed in claim 1, wherein only 30% to 40% of the proportions by weight provided of calcium carbonate (CaCO3) powder are mixed with the polyvinylchloride (PVC) powder and the additives prior to or during step e, and the remaining proportions by weight of calcium carbonate (CaCO3) powder are mixed during step f.

18. The process as claimed in claim 1, wherein the sheet has a temperature of about 165° C. when emerging from the slot die in step h, and leading to step i.

19. The process as claimed in claim 6, wherein at least one layer of lacquer is a castable lacquer and which is immediately hardened by UV or electron beams after the castable lacquer is applied to the sheet.

* * * * *